(12) United States Patent
Tsai

(10) Patent No.: US 6,603,629 B1
(45) Date of Patent: Aug. 5, 2003

(54) NON-CONTACT SERVO TRACK WRITING APPARATUS AND METHOD

(75) Inventor: John C. Tsai, Saratoga, CA (US)

(73) Assignee: Excel Precision, Inc., Santa Clara, CA (US)

( * ) Notice: Subject to any disclaimer, the term of this patent is extended or adjusted under 35 U.S.C. 154(b) by 764 days.

(21) Appl. No.: 09/121,177

(22) Filed: Jul. 22, 1998

Related U.S. Application Data

(63) Continuation-in-part of application No. 08/706,449, filed on Sep. 3, 1996, now abandoned.

(51) Int. Cl.[7] ............................................. G11B 21/10
(52) U.S. Cl. ..................................................... 360/77.03
(58) Field of Search .............................. 360/77.03, 51, 360/75, 78.11, 77.05, 103, 77.02

(56) References Cited

U.S. PATENT DOCUMENTS

| | | |
|---|---|---|
| 4,987,505 A | 1/1991 | Iwabuchi et al. |
| 5,311,378 A | 5/1994 | Williams et al. |
| 5,315,372 A | 5/1994 | Tsai |
| 5,471,304 A | 11/1995 | Wang |
| 5,488,519 A | 1/1996 | Ishida et al. |
| 5,568,337 A | 10/1996 | Eguchi et al. |
| 5,610,777 A | 3/1997 | Dang et al. |
| 5,771,130 A | * 6/1998 | Baker ...................... 360/77.03 |
| 5,774,295 A | * 6/1998 | Tsai ........................ 360/77.03 |

* cited by examiner

Primary Examiner—Nabil Hindi
(74) Attorney, Agent, or Firm—Raymond E. Roberts; IPLO Intellectual Property Law Offices

(57) ABSTRACT

A servo track writing apparatus (10) for writing servo tracks (16) on a media disk (14) of a disk drive assembly (12) having a Positioning arm (22) with a through hole (28) therein. The writing apparatus (10) has a laser source (29) which directs a source beam (30) through a polarizing beam splitter (32) and a quarter-wave plate (34) to either pass through the through hole (28) and reflect off of the media disk (14) as a reflected beam (38), or to be reflected from regions of the positioning arm (22) proximate to the through hole (28) as a reflected beam (56). The writing apparatus (10) further has a remote tracking arm (42) with two photodiodes (40a, 40b) suitably mounted thereon to receive the reflected beams (38, 56). The tracking arm (42) is caused by a motive means (54) to precisely track the positioning arm (22) of the disk drive assembly (12). A laser interferometer (58) is then used to detect an optical target (60) mounted on the tracking arm (42) and determine positioning for writing of the servo track (16).

16 Claims, 5 Drawing Sheets

Intensity across the thru hole

First derivative of intensity distribution

2nd derivative of intensity distribution

Reflective mark (e.g., reflective surface) on the pivot of actuator

Photodiodes placed at the edges

Intensity profile across the reference mark

First derivative of intensity distribution

2nd derivative of intensity distribution

NON-CONTACT SERVO TRACK WRITING APPARATUS AND METHOD

This application is a continuation-in-part of copending application 08/706,449, filed on Sep. 3, 1996 now abandoned.

TECHNICAL FIELD

The present invention relates generally to the field of laser interferometry and more particularly to an improved system for accurately positioning a mechanical arm using a laser interferometer. The predominant current usage of the non-contact servo track writing apparatus is in the positioning of servo track writing heads in the manufacture of very small computer hard disk drives.

BACKGROUND ART

When manufacturing computer hard disk drives it is necessary to magnetically "write" servo tracks on the disks, which servo tracks constitute the references from which other positions on the disks are located. Given the very high track density of modem hard disk media, it is critical that these servo tracks be accurately located and, therefore, it is necessary to position the servo track writing apparatus over the disk as precisely as possible during this process. Laser interferometry has been widely used in this endeavor due to the high resolution, high repeatability, great accuracy and fast signal updating rate of this technology. A typical prior art configuration has included a retro-reflector mounted on the positioning arm of the disk drive with the beam of the laser interferometer directed into the retro-reflector such that movement of the retro-reflector may be detected and measured by the interferometer. In this prior art method, the positioning arm has an aperture into which a pin may be placed for moving the arm to properly locate the head for writing the servo track. This method has worked perfectly well for most existing hard disk media. However, the demand for smaller and smaller hard disk media has now resulted in the desire to produce hard disk media smaller even than two inches in diameter. Currently, there exists media of 1.8 inches and smaller in various stages of production and pre production planning. With such very small media disks, not only is it increasingly critical that the servo tracks be accurately placed (since the actual physical track density is increased as the size of the media is decreased) the problem is also introduced that an arm for positioning the write head must be so small that it is difficult to attach a retro-reflector thereto. Furthermore, the entire hard disk mechanism is so small that it is not possible to introduce any bulky equipment into the area of the servo writing mechanism to position the arm.

It is known in the art to use a laser interferometer to position devices in a non-invasive manner. U.S. Pat. No. 5,108,184, issued to Brown et al., teaches a variation of the method of using a reflective surface of a device to gauge the position of that device with a laser interferometer.

Further, it is known to provide a non-invasive means for positioning a servo track writing device using a laser interferometer. For example, the present inventor's U.S. Pat. No. 5,315,372 teaches one method of accomplishing this goal using a movable arm having an interferometer target, separate from the read/write head positioning arm of a workpiece disk drive. At the time of the inventor's prior application no prior art device was readily adaptable to control very small positioning arms while providing the same degree of accuracy found in direct reading interferometers having the retro-reflector mounted on the head positioning arm. Even to date, all prior art non-invasive means require either a large reflective surface than is available in this application, or else have sacrificed accuracy by being highly dependent upon the flatness of the reflective surface, or else have not provided sufficient resolution for the writing of servo tracks on very small media.

The present inventor's '372 patent did much to advance the art of servotrack writing, but it did so at the expense of still using a flat reflective surface on the small positioning arm. Further, due to the desirability of sensing the positioning arm at a radially displaced point to maximize resolution, accessibility problems for interferometer beams became problematic. The inventor's '372 patent also discussed, briefly, the possibility of using a common positioning arm feature called a through hole as a sensing target, but initial embodiments utilizing that concept provided less resolution than the main '372 technique. Thus practical read/write arm position sensing which was truly non-invasive and direct remained an industry goal. To the inventor's knowledge, no prior art device has yet to provide both an efficient means to directly and accurately determining the position of a very small positioning arm while also providing a means for adjusting such position.

DISCLOSURE OF INVENTION

Accordingly, it is an object of the present invention to provide a means for positioning a servo track writing device which is adaptable for use with very small media disks and disk drive assemblies.

It is another object of the present invention to provide a means for positioning a servo track writing device which can very accurately position the writing heads.

It is still another object of the present invention to provide a means for positioning a servo track writing device which will direct the laser beam along a narrow path to and from the writing device.

It is yet another object of the present invention to provide a servo track writing device which will both accurately determine the location of a head positioning arm and also cause such arm to move to a correct position.

It is still another object of the present invention to provide a servo track writing device which is adaptable for use with various types of head positioning actuators.

It is yet another object of the present invention to provide a servo track writing device which is inexpensive to produce and reliable in operation.

It is still another object of the present invention to provide a servo track writing device which can be attached to a disk drive assembly, used, and detached quickly, so as to facilitate assembly line production of disk drive devices.

Briefly, the preferred embodiment of the present invention is a servo track writing apparatus for accurately positioning a magnetic head mounted on a positioning arm. The positioning arm is located within a disk drive assembly workpiece and has a through hole, an artifact of prior art positioning systems present in must positioning arms still in use today. The positioning arm is movable by a positioning means inherent to the disk drive workpiece to position the magnetic head over a rotating magnetic media. The inventive writing apparatus has a tracking arm located external to the disk drive assembly which has its own motive means, suitable for moving the tracking arm in a fixed relationship with the positioning arm of the disk drive assembly. The tracking arm has mounted on it a detection system for detecting the edges of the through hole in the positioning arm and thereby maintaining it in a fixed positional relationship with the positioning arm inside the disk drive assembly. A position determining system is provided and used to determine the position of the tracking arm, and to therefrom infer the position of the magnetic head within the disk drive assembly.

An advantage of the present invention is that it retains the accuracy of conventional laser interferometer head positioning devices.

A further advantage of the present invention is that it can be used with very small head positioning arms and very small magnetic media disks.

Yet another advantage of the present invention is that it is not necessary to mechanically connect any positioning apparatus to the head positioning arm.

Still another advantage of the present invention is that it is inexpensive to produce.

Yet another advantage of the present invention is that it can be easily adapted for use with different types of disk drives.

Still another advantage of the present invention is that it is readily adaptable to disk drive production environments.

These and other objects and advantages of the present invention will become clear to those skilled in the art in view of the description of the best presently known modes of carrying out the invention and the industrial applicability of the preferred embodiments as described herein and as illustrated in the several figures of the drawing.

BEST MODE FOR CARRYING OUT INVENTION

The best presently known mode for carrying out the invention is a servo track writing apparatus for use on rotating magnetic media "hard disk drives." The predominant expected usage of the inventive servo track writing apparatus is in the computer equipment manufacturing industry, particularly in manufacture of very small such hard disk drives, wherein the ability to accurately locate a head positioning arm without introducing bulky devices into the disk drive is desirable.

Figure 1:
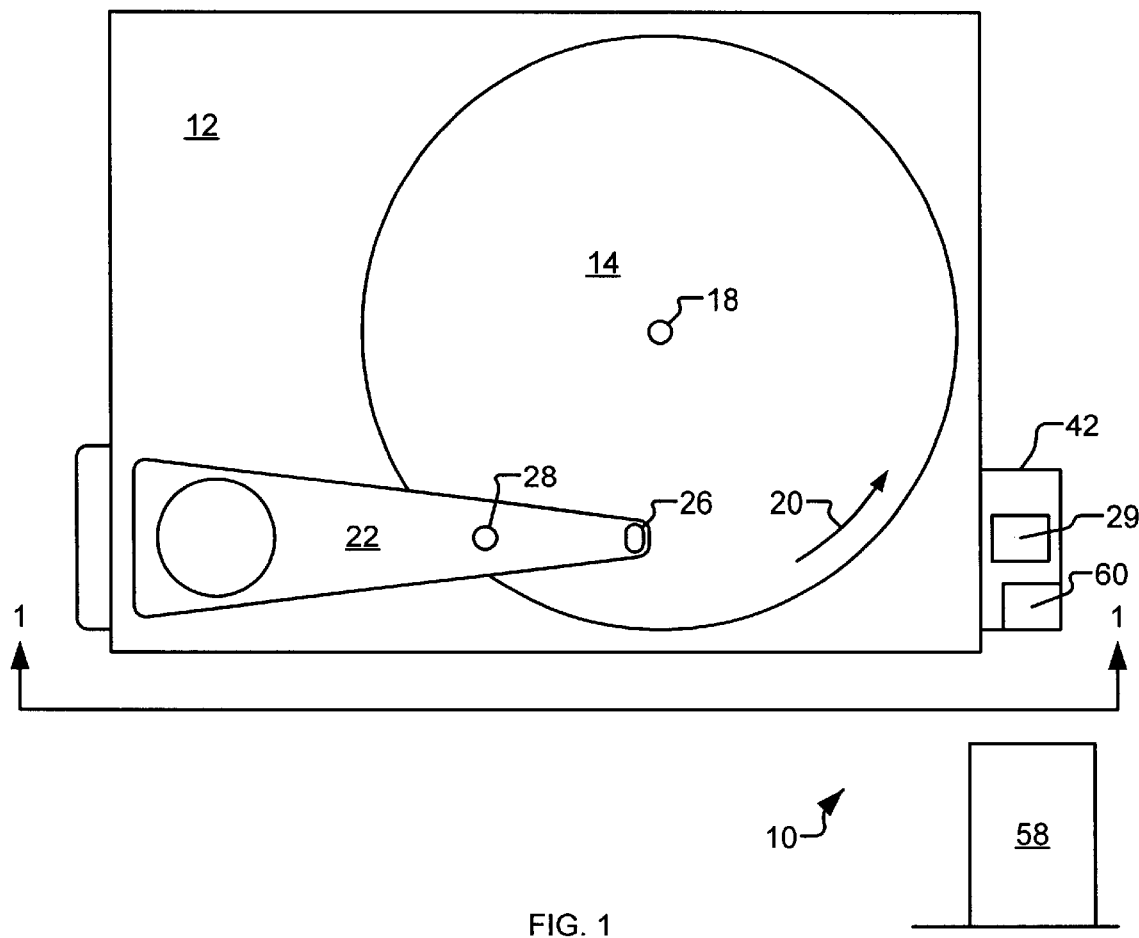
FIG. 1 is a top plan view depiction of the servo track writing apparatus according to the present invention, shown in use on a workpiece.
Figure 2:
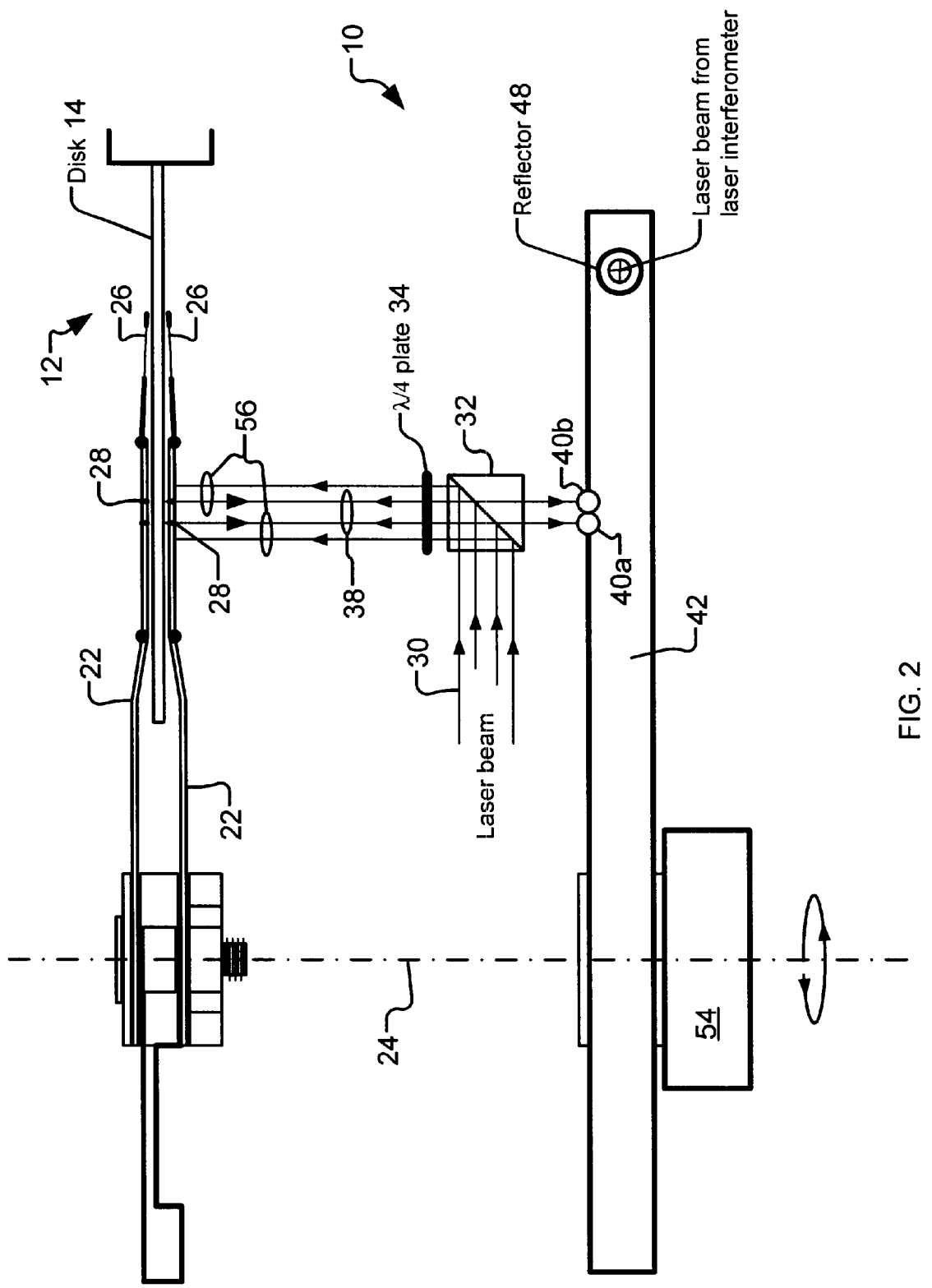
FIG. 2 is a side elevational view taken along section 1—1 of FIG. 1 of the writing apparatus (omitting non pertinent elements)

The servo track writing apparatus of the presently preferred embodiment of the invention is illustrated in a top view in FIG. 1 and in side view in FIG. 2 (omitting non pertinent elements, like the workpiece housing), and is designated therein by the general reference character 10. The servo track writing apparatus 10 has as a disk drive assembly 12 with a media disk 14 upon which a servo track 16 (not shown, servo tracks are not physically visible) is to be written. The media disk 14 is caused to spin about a disk axis 18 as indicated by a disk rotation directional arrow 20. Positioning arms 22 pivot about a head positioning arm axis 24, to position read/write heads 26 as required over the rotating media disk 14. A key feature of the positioning arms 22 is a through hole 28. The media disk 14, the positioning arm 22 and the read/write head 26 are all components of the disk drive assembly 12 (i.e., the workpiece) upon which the operation of writing the servo track 16 is to be performed.

The present invention takes advantage of the existing through hole 28 in the positioning arm 22 as a reference (the through hole 28 being a conventional feature provided for the use of a positioning system used in conjunction with prior art methods). The method used by the inventor to accomplish this is to provide a laser source 29 (FIG. 1) which directs a laser source beam 30 (FIG. 2) with frequency modulated intensity into a polarizing beam splitter 32 and through a quarter wave plate 34 to form a target beam 36.

Two variations of the present invention are possible using the target beam 36 and the through hole 28. For the first variation, the target beam 36 is directed at the positioning arm 22, where a portion the target beam 36 goes through the through hole 28 and is reflected by the surface of the media disk 14 (which typically has approximately a seventy percent reflectivity factor) back to the beam splitter 32 as a reflected beam 38. Other portions of the target beam 36 are absorbed by the positioning arm 22, which must be at least partially opaque for this to occur.

Figure 3:
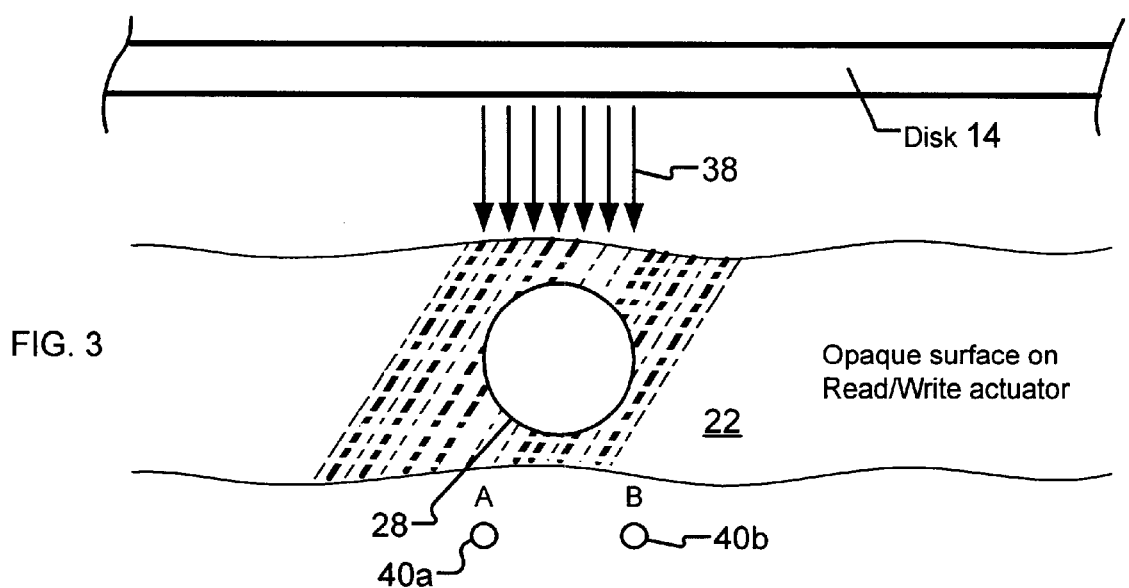
FIG. 3 is a stylized depiction of a first variation of the optical process used.

FIG. 3 is a stylized depiction of the optical process for the first variation. Two photodiodes 40a and 40b (only one photodiode 40 may be used, but this is not a preferred embodiment) are positioned on a remote tracking arm 42 at the edges of the reflected beam 38. Signals are produced as the reflected beam 38 (having been rotated in polarity by the quarter wave plate 34 and then passed back through the beam splitter 32) impinges upon the photodiodes 40a and 40b.

Figure 4A:
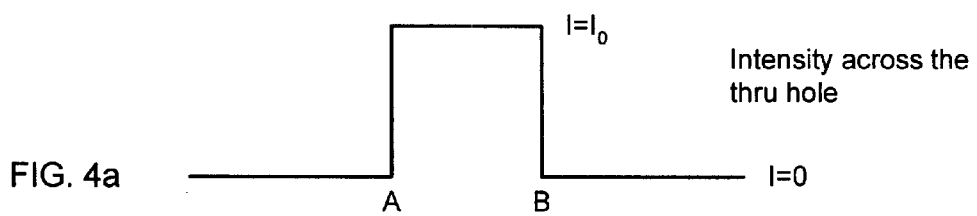
FIG. 4a, FIG. 4b, and FIG. 4c respectively depict the intensity profile, its first derivative, and its second derivative of the beam intensity obtained using the variation of FIG. 3.
Figure 4B:
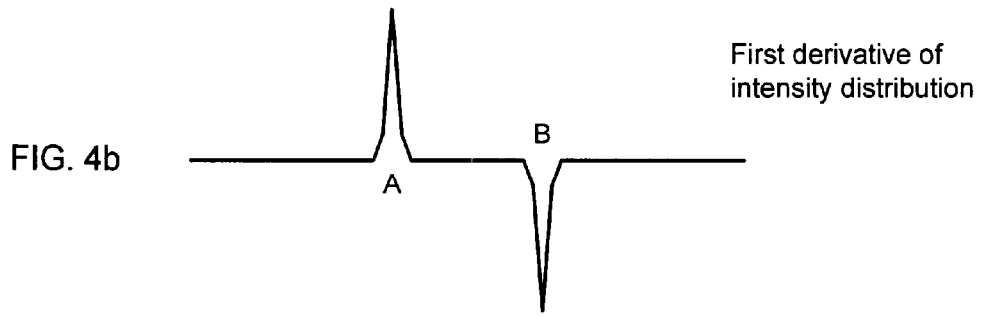
Figure 4C:
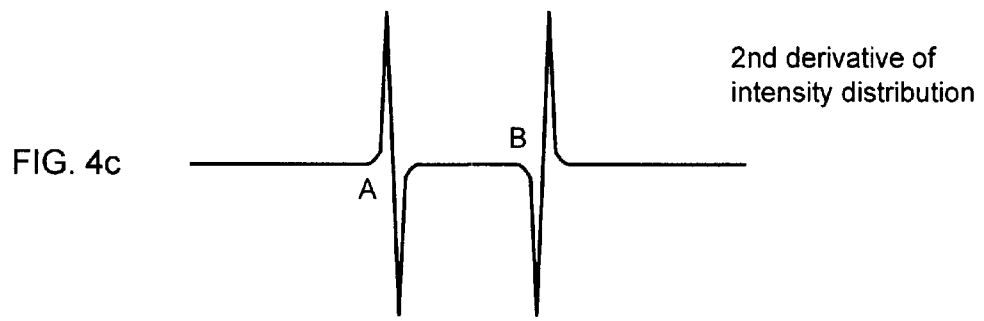

FIGS. 4a–c depict the intensity profile, its first derivative, and its second derivative, respectively. The intensity profile of FIG. 4a can be used to determine simple hole and sensor alignment. But this simple approach can be awkward to use in some situations.

Figure 7A:
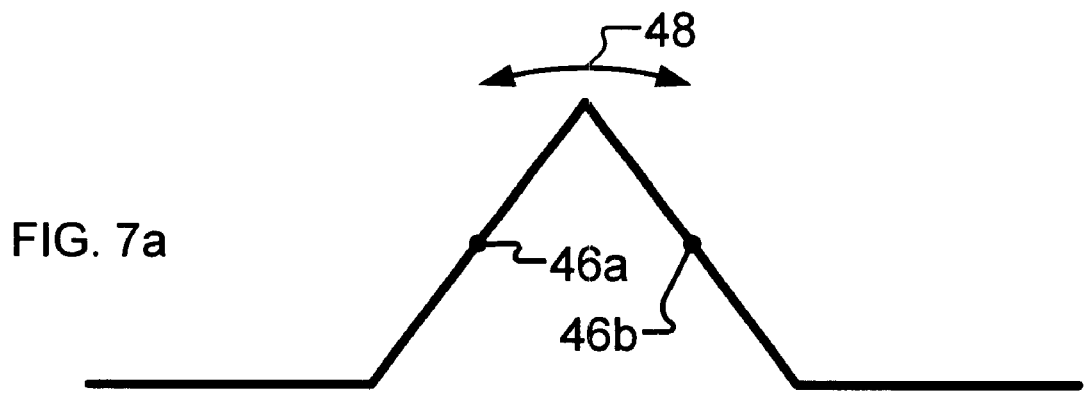
FIG. 7a and FIG. 7b are expanded views comparing the first and second derivative waveforms obtained in either FIG. 4b–c or FIG. 6b–c.
Figure 7B:
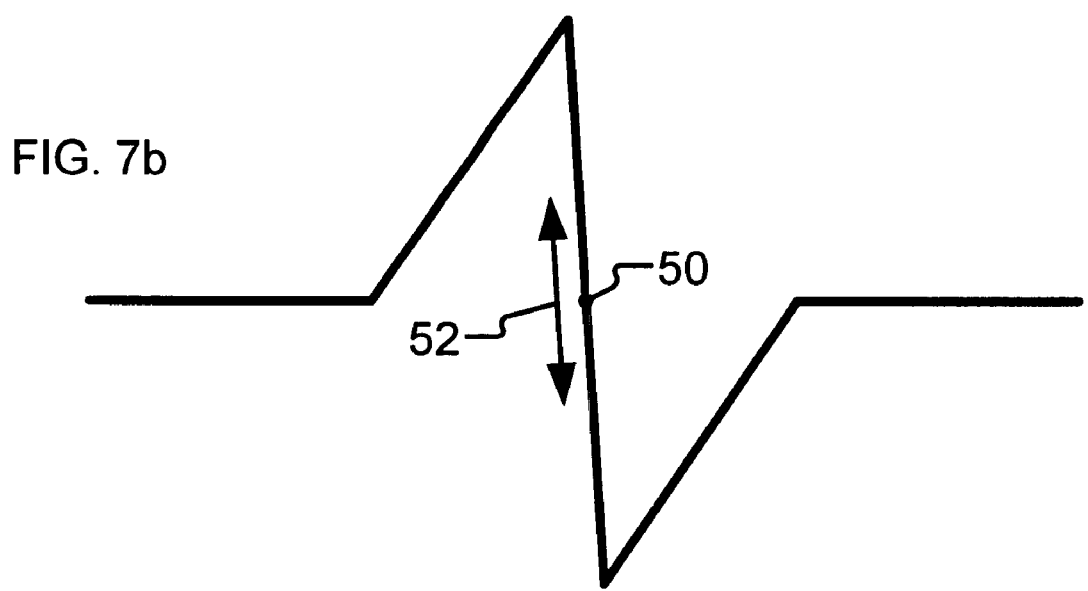

FIGS. 7a–b particularly illustrate the uses of the first and second derivatives shown in FIGS. 4b–c to improve the obtainable synchronization. FIG. 7a (a horizontally expanded view of FIG. 4b) has a peak 44 which is more easily locked to than the mere leading and trailing edges of FIG. 4a. Further, if synchronization starts to degrade, by movement in amplitude along the profile toward either point 46a or point 46b, this is easily detected and efforts can be made to regain synchronization. unfortunately, electronic noise and signal amplitude variation can cause the peak 44 to be misinterpreted, and since degrading synchronization causes a downward movement on both sides of the peak 44, as depicted by arrowed line 48, determining which direction to move to correct synchronization can be difficult.

FIG. 7b (a horizontally expanded view of FIG. 4c) shows, use of the second derivative profile to provide additional benefit and to overcome the limitations noted for the first derivative. Rather than detecting the first derivative peak 44 of FIG. 7a, a much more stable and consistent second derivative zero-crossing point 50 may be used instead. Further, as depicted by arrowed line 52 in FIG. 7b, any degradation in synchronization now produces either a positive or negative amplitude change, which unambiguously indicates the direction in which movement is needed to regain synchronization.

The inventor has found that this method may be used to lock the edges of the through hole 28 to the center of the dispersive signals created by the photodiodes 40a and 40b, permitting control of a positioning means (not shown) inherent to the disk drive assembly 12 to slave the positioning arm 22 to the remote tracking arm 42. Then, under control of a motive means 54 (such as a voice coil motor or a stepper motor), accurate servotrack writing can be carried in a manner requiring absolutely no modification of existing disk drive assemblies 12.

For the second variation, the target beam 36 is also directed at the positioning arm 22, and again a portion of the target beam 36 goes through the through hole 28, but here this portion is of no concern. What is of concern is the portion of the target beam 36 striking and being reflected from the positioning arm 22 in the region of the through hole 28 as a reflected beam 56.

Figure 5:
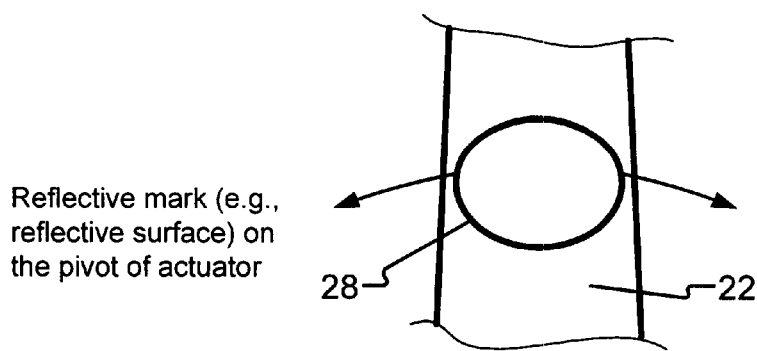
FIG. 5 is a stylized depiction of a second variation of the optical process used.
Figure 6A:
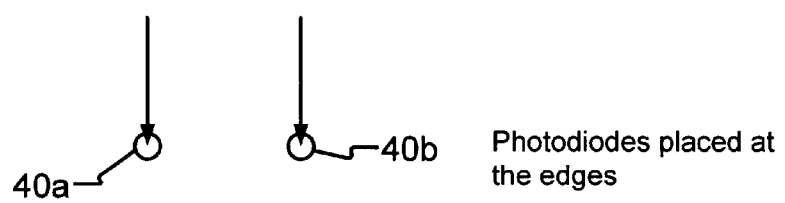
FIG. 6a, FIG. 6b, and FIG. 6c respectively depict the intensity profile, its first derivative, and its second derivative of the beam intensity obtained using the variation of FIG. 5.
Figure 6A:
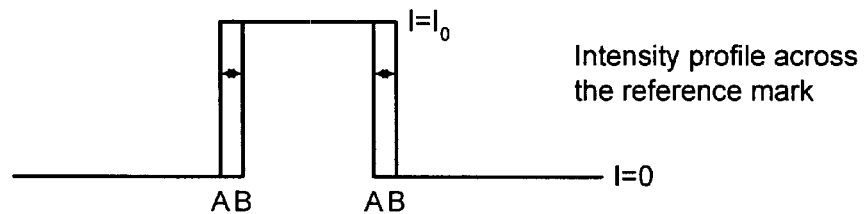
Figure 6B:
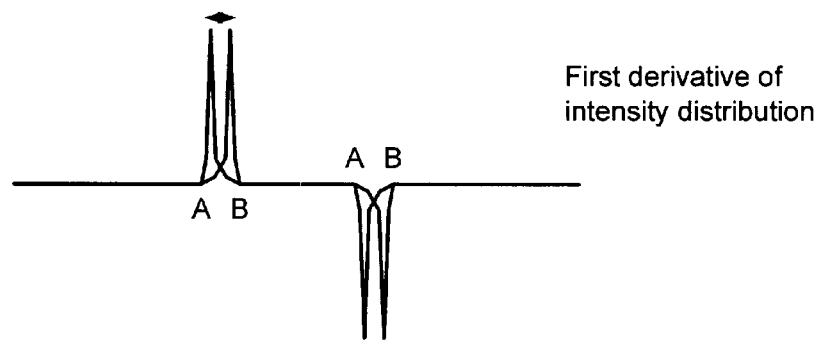
Figure 6C:
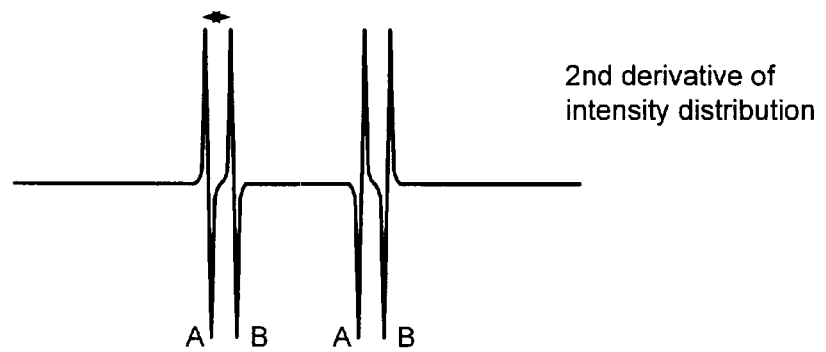

FIG. 5 is a stylized depiction of the optical process for the second variation. Again two photodiodes 40a and 40b are used, but positioned on the remote tracking arm 42 at the edges of the reflected beam 56 and signals are produced as the reflected beam 56 impinges upon the photodiodes 40a and 40b.

FIGS. 6 a–c depict the intensity profile, its first derivative, and its second derivative respectively of this variation. And much in the manner discussed above for FIGS. 4a–c and FIGS. 7a–b, it here also follows that through hole 28 edge detection in this manner can also produce highly defined positional feedback.

Of course, accurate knowledge of the position of the remote tracking arm 42 is still required in order to infer the position of the read/write heads. However, this can now easily be obtained by conventional laser interferometric methods. In the preferred embodiment, a generally conventional laser interferometer 58 is provided to determine the position of an optical target 60 mounted on the remote tracking arm 42. The optical target 60 may be any surface or component suitable for detection with the laser beam of the laser interferometer 58, and conventional examples currently widely used in the field include plane mirrors and retroreflective cubes. Notably both the remote tracking arm 42 and the optical target 60 may now be sized and shaped as desired, since they are entirely separate from and in no way physically effect the performance of the positioning arm 22.

In the preferred embodiment the remote tracking arm 42, and the optical target 60 mounted thereon pivot about the same arm axis 24 as does the positioning arm 22 itself. As can be appreciated, provided that a known fixed relationship is maintained between the tracking arm 42 and the positioning arm 22, the read/write head 26 can be accurately located in relation to the servo track 16 by means of the laser interferometer 58.

This invention is in marked contrast to prior art techniques, which have relied upon mounting of large, heavy, and/or aerodynamically less desirable optical targets on the positioning arm 22, or else having substantial flat reflective surface provided on the positioning arm 22. The present invention detects the edges of the through hole 28, a feature present in most positioning arms 22 used in the industry today, thus requiring no added structure to the workpiece disk drive assembly 12.

Various modifications may be made to the invention without altering its value or scope. For example, changes in the geometry or relationship of the components of the inventive servo track writing apparatus 10 can be used to adapt it to specific disk drive assemblies 12. Indeed, since it is a primary purpose of the inventive servo track writing apparatus 10 to work with extremely small disk drive assemblies 12 having very crowded conditions therein, it is anticipated that minor changes in the arrangement of components may be necessary in order to adapt the inventive servo track writing apparatus 10 to each new application.

One skilled in the art will also recognize that the inventive servo track writing apparatus 10 may readily be adapted for use with a disk drive assembly 12 having multiple media disks 14 and/or with other variations and types of drive assemblies.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The servo track writing apparatus 10 is adapted to be widely used in the manufacture of hard magnetic disk drive devices. The predominant anticipated usage is for the writing of servo tracks 16 on drive units having media diameters of less than two inches.

Given the necessity for precise alignment of all components and tracks in modem high density disk drive assemblies, it has become industry practice to delay writing servo tracks until after the disk drive is nearly fully assembled. Among other advantages, this eliminates cumulative error that can be introduced by variance in the component parts of the disk drive. However, this also introduces the problem that there is little or no room to connect head position detection means and/or head position alteration means into the assembled drive. Once the servo track 16 is written onto the media disk 14, the disk drive assembly 12 can locate track positions in relation to the servo track 16. However, the servo tracks 16 must, themselves, be placed in relation to an external reference, and that purpose is served by the inventive servo track writing apparatus 10.

In use, the inventive servo track writing apparatus 10 operates much as prior art comparable devices, except that physical contact with the positioning means in the disk drive assembly 12 is not necessary, since position of the read/write head 26 is determined in the non-contact method described herein, and the positioning means of the workpiece disk drive assembly 12 is used to move the read/write head 26.

The servo track writing apparatus 10 of the present invention may be utilized in any application wherein conventional servo track positioning devices are used, and also in those applications wherein prior art means would not suffice, since they would not fit into the available space.

Since the servo track writing apparatus 10 of the present invention may be readily constructed and is physically significantly similar to prior art conventional servo track writing devices, and since it may be used in conjunction with existing laser interferometer units, it is expected that it will be acceptable in the industry as a substitute for conventional servo track writing devices and as a means for writing servo tracks to newly developed small disk drive assemblies, as well as even smaller units yet to be developed. For these and other reasons, it is expected that the utility and industrial applicability of the present invention will be both significant in scope and long-lasting in duration.

I claim:

1. A servo track writing apparatus for positioning a read/write head in a disk drive assembly wherein the read/write head is mounted on a positioning arm, the positioning arm has a through hole therein, and the positioning arm is movable by a positioning means over a media, the writing apparatus comprising:

a tracking arm located external to the disk drive assembly;

moving means for moving said tracking arm in fixed relationship with the positioning arm;

position determining means for determining the position of said tracking arm;

detection means for detecting the edges of the through hole of the positioning arm relative to the tracking arm; and a control unit suitable to:
      operate said moving means and said detection means such that said tracking arm and the positioning arm attain a particular geometric relationship;
      operate said moving means and the positioning means such that said tracking arm and the positioning arm synchronously are maintained in said geometric relationship;
      operate said position determining means to measure the position of said tracking arm and therefrom infer the positions of the positioning arm and the read/write head inside the disk drive assembly; and
      direct the disk drive assembly to position and maintain the read/write head as desired for servo track writing in the media.

2. The servo track writing apparatus of claim 1, wherein said position determining means includes:

an optical target mounted on said tracking arm; and a laser interferometer for measuring the position of said optical target.

3. The servo track writing apparatus of claim 1, wherein said detection means includes:

a light source;

a photodiode assembly having at least one photodiode, mounted on said tracking arm; and beam directing means for directing a light beam from said light source at the through hole in the positioning arm and then directing reflected portions of said light beam onto said photodiode assembly, to controllably permit movement of the tracking arm with said moving means of the positioning means which is synchronized.

4. The servo track writing apparatus of claim 3, wherein said photodiode assembly suitably detects portions of said light beam which pass through the through hole and are reflected by the media of the disk drive assembly.

5. The servo track writing apparatus of claim 3, wherein said photodiode assembly detects portions of said light beam which are reflected from regions of the positioning arm proximate to the though hole in the positioning arm.

6. The servo track writing apparatus of claim 3, wherein said control unit determines an intensity profile of reflected portions of said light beam, to more controllably permit synchronized movement of said moving means and the positioning means.

7. The servo track writing apparatus of claim 6, wherein said control unit determines a first derivative from said intensity profile, to more accurately controllably permit synchronized movement of said moving means and the positioning means.

8. The servo track writing apparatus of claim 6, wherein said control unit determines a second derivative from said intensity profile, to still more accurately controllably permit synchronized movement of said moving means and the positioning means.

9. The servo track writing apparatus of claim 3, wherein:

said light source is a laser; and said beam directing means includes a polarizing beam splitter and a quarter-wave plate suitable for capturing and directing said light beam into the disk drive assembly back, and for directing portions of said light beam reflected back out of the disk drive assembly onto said photodiode assembly of said detection means.

10. A servo track writing method for positioning a read/write head in a disk drive assembly wherein the read/write head is mounted on a positioning arm, the positioning arm has a through hole therein, and the positioning arm is movable by a positioning means over a media, the writing method comprising:

detecting the edges of the through hole of the positioning arm;

locking the positioning arm of the disk drive assembly and said tracking arm into a set geometric relationship based upon said step of detecting;

maintaining the positioning arm and said tracking arm synchronously in said geometric relationship based upon feedback from continuing operation of said step of detecting;

determining the position of said tracking arm and therefrom inferring the position of the read/write head inside the disk drive assembly; and directing the disk drive assembly to position and maintain the read/write head as desired for servo track writing in the media.

11. The writing method of claim 10, wherein said step of determining includes:

deriving a first derivative of a signal obtained in said step of detecting; and locking said tracking arm in said geometric relationship based upon a peak detected in said first derivative.

12. The writing method of claim 10, wherein said step of determining includes:

deriving a second derivative of a signal obtained in said step of detecting; and locking said tracking arm in said geometric relationship based upon a zero-crossing point detected in said second derivative.

13. A servo track writing apparatus for positioning a read/write head in a disk drive assembly wherein the read/write head is mounted on a positioning arm, the positioning arm has a through hole therein, and the positioning arm is movable by a positioning means over a media, the writing apparatus comprising:

a tracking arm located external to the disk drive assembly;

moving means for moving said tracking arm in fixed relationship with the positioning arm;

position determining means for determining the position of said tracking arm;

a photodiode assembly having at least one photodiode mounted on said tracking arm;

detection means for detecting the edges of the through hole of the positioning arm relative to the tracking arm;

a light source;

beam directing means for directing a light beam from said light source at the through hole in the positioning arm and then directing reflected portions of said light beam onto said photodiode assembly; and a control unit suitable to:
  determine an intensity profile of reflected portions of said light beam and further determine a first derivative from said intensity profile, to more accurately controllably permit synchronized movement of said moving means and the positioning means;
  operate said moving means and said detection means such that said tracking arm and the positioning arm attain a particular geometric relationship;
  operate said moving means and the positioning means such that said tracking arm and the positioning arm synchronously are maintained in said geometric relationship;
  operate said position determining means to measure the position of said tracking arm and therefrom infer the positions of the positioning arm and the read/write head inside the disk drive assembly; and
  direct the disk drive assembly to position and maintain the read/write head as desired for servo track writing in the media.

14. A servo track writing apparatus for positioning a read/write head in a disk drive assembly wherein the read/write head is mounted on a positioning arm, the positioning arm has a through hole therein, and the positioning arm is movable by a positioning means over a media, the writing apparatus comprising:

a tracking arm located external to the disk drive assembly;

moving means for moving said tracking arm in fixed relationship with the positioning arm;

position determining means for determining the position of said tracking arm;

a photodiode assembly having at least one photodiode mounted on said tracking arm;

detection means for detecting the edges of the through hole of the positioning arm relative to the tracking arm;

a light source;

beam directing means for directing a light beam from said light source at the through hole in the positioning arm and then directing reflected portions of said light beam onto said photodiode assembly; and a control unit suitable to:
  determine an intensity profile of reflected portions of said light beam and further determine a second derivative from said intensity profile, to more accurately controllably permit synchronized movement of said moving means and the positioning means;
  operate said moving means and said detection means such that said tracking arm and the positioning arm attain a particular geometric relationship;
  operate said moving means and the positioning means such that said tracking arm and the positioning arm synchronously are maintained in said geometric relationship;
  operate said position determining means to measure the position of said tracking arm and therefrom infer the positions of the positioning arm and the read/write head inside the disk drive assembly; and
  direct the disk drive assembly to position and maintain the read/write head as desired for servo track writing in the media.

15. A servo track writing method for positioning a read/write head in a disk drive assembly wherein the read/write head is mounted on a positioning arm, the positioning arm has a through hole therein, and the positioning arm is movable by a positioning means over a media, the writing method comprising:

detecting the edges of the through hole of the positioning arm;

locking the positioning arm of the disk drive assembly and said tracking arm into a set geometric relationship based upon deriving a first derivative of a signal obtained in said step of detecting and locking said tracking arm in said geometric relationship based upon a peak detected in said first derivative;

maintaining the positioning arm and said tracking arm synchronously in said geometric relationship based upon feedback from continuing operation of said step of detecting;

determining the position of said tracking arm and therefrom inferring the position of the read/write head inside the disk drive assembly; and directing the disk drive assembly to position and maintain the read/write head as desired for servo track writing in the media.

16. A servo track writing method for positioning a read/write head in a disk drive assembly wherein the read/write head is mounted on a positioning arm, the positioning arm has a through hole therein, and the positioning arm is movable by a positioning means over a media, the writing method comprising:

detecting the edges of the through hole of the positioning arm;

locking the positioning arm of the disk drive assembly and said tracking arm into a set geometric relationship based upon deriving a second derivative of a signal obtained in said step of detecting and locking said tracking arm in said geometric relationship based upon a peak detected in said second derivative;

maintaining the positioning arm and said tracking arm synchronously in said geometric relationship based upon feedback from continuing operation of said step of detecting;

determining the position of said tracking arm and therefrom inferring the position of the read/write head inside the disk drive assembly; and directing the disk drive assembly to position and maintain the read/write head as desired for servo track writing in the media.

* * * * *